US012249456B2

(12) United States Patent
Xu et al.

(10) Patent No.: US 12,249,456 B2
(45) Date of Patent: Mar. 11, 2025

(54) WINDING CYLINDER OF STEREOSCOPIC WOUND IRON CORE TRANSFORMER

(71) Applicants: Haihong Electric Co., Ltd., Jiangmen (CN); Guangdong Tritype Electric Co., Ltd., Jiangmen (CN)

(72) Inventors: Kaixuan Xu, Jiangmen (CN); Qingning Liang, Jiangmen (CN); Shuwei Situ, Jiangmen (CN); Yuxiang Qi, Jiangmen (CN); Danju Song, Jiangmen (CN); Wenjie Fang, Jiangmen (CN); Fei Li, Jiangmen (CN); Xueming Zhang, Jiangmen (CN); Yucheng Zhou, Jiangmen (CN); Wenhui Fang, Jiangmen (CN); Lizhen Zhai, Jiangmen (CN); Yixiong Liang, Jiangmen (CN); Huaming Wang, Jiangmen (CN); Quanan Xu, Jiangmen (CN)

(73) Assignees: Haihong Electric Co., LTD., Guangdong (CN); Guangdong Tritype Electric Co., Ltd., Guangdong (CN)

( * ) Notice: Subject to any disclaimer, the term of this patent is extended or adjusted under 35 U.S.C. 154(b) by 0 days.

(21) Appl. No.: 17/765,260

(22) PCT Filed: Nov. 10, 2021

(86) PCT No.: PCT/CN2021/129877

§ 371 (c)(1),
(2) Date: Mar. 30, 2022

(87) PCT Pub. No.: WO2022/252498

PCT Pub. Date: Dec. 8, 2022

(65) Prior Publication Data

US 2024/0071684 A1 Feb. 29, 2024

(30) Foreign Application Priority Data

May 31, 2021 (CN) ......................... 202121200140.5

(51) Int. Cl.
*H01F 41/06* (2016.01)

(52) U.S. Cl.
CPC .................................... *H01F 41/06* (2013.01)

(58) Field of Classification Search
CPC ............................... H01F 41/06; H01F 41/063
See application file for complete search history.

(56) References Cited

FOREIGN PATENT DOCUMENTS

CN 107887152 A * 4/2018
CN 109065354 A * 12/2018 ............. H01F 41/06
(Continued)

*Primary Examiner* — Aneeta Yodichkas
*Assistant Examiner* — Jose K Abraham
(74) *Attorney, Agent, or Firm* — Weisberg I.P. Law, P.A.

(57) ABSTRACT

A winding cylinder of a stereoscopic wound iron core transformer is disclosed, including an outer cylinder, an inner cylinder and a tension assembly. The outer cylinder is movably connected with the inner cylinder through a bearing assembly, and the outer cylinder rotatable around an axis of the inner cylinder. The tension assembly includes a screw, a spring and a connecting assembly. The connecting assembly includes a fixing portion, a friction portion and a transmission portion, the friction portion and the transmission portion are both arranged around the inner cylinder, and the transmission portion is fixedly connected with the outer cylinder. A side face of the inner cylinder is provided with a through hole, and the fixing portion penetrates through the through hole and is fixedly connected with the friction portion.

9 Claims, 4 Drawing Sheets

(56) References Cited

FOREIGN PATENT DOCUMENTS

| | | | | | |
|---|---|---|---|---|---|
| CN | 109545540 | A | * | 3/2019 | H01F 41/06 |
| CN | 110752089 | A | * | 2/2020 | |
| CN | 109545540 | B | * | 12/2020 | H01F 41/06 |
| CN | 112110302 | A | * | 12/2020 | B65H 75/22 |
| CN | 212676093 | U | * | 3/2021 | |
| WO | WO-2014167970 | A1 | * | 10/2014 | H01F 41/04 |

* cited by examiner

WINDING CYLINDER OF STEREOSCOPIC WOUND IRON CORE TRANSFORMER

CROSS-REFERENCE TO RELATED APPLICATIONS

This application is a Submission under 35 U.S.C. § 371 for U.S. National Stage Patent Application of, and claims priority to, International Application Number PCT/CN2021/129877, entitled WINDING CYLINDER OF STEREOSCOPIC WOUND IRON CORE TRANSFORMER, filed Nov. 10, 2021, which is related to and claims priority to Chinese Patent Application Serial Number 202121200140.5, filed May 31, 2021, the entirety of all of which are incorporated herein by reference.

TECHNICAL FIELD

The disclosure relates to the technical field of transformer production, and more particularly, to a winding cylinder of a stereoscopic wound iron core transformer.

BACKGROUND

With the advantages of energy saving, environmental protection and high efficiency, stereoscopic wound iron core transformers are widely used in society. Therefore, all manufacturers are paying attention to how to manufacture safer and more reliable products. A coil is used as an important core member, so that a quality and a performance of the coil directly affect a safety and a reliability of products. At present, some manufacturers have used a winding die of a planetary gear train for the stereoscopic wound iron core transformer, which can not only replace a traditional foil winding machine, but also simplify a winding process and improve an efficiency. However, the winding die of the planetary gear train needs to be equipped with a cylinder for mounting a foil tape or interlayer paper. As a self-rotating device in the planetary gear train, the cylinder winds the foil tape or the interlayer paper on an iron core post or an insulating cylinder during rotation. However, there is a lack of cylinder with both universality and stability at the present stage, which greatly affects an efficiency of coil production of the transformer and a quality of products.

SUMMARY

In order to solve the above problems, the disclosure aims to provide a winding cylinder of a stereoscopic wound iron core transformer, so as to improve a universality and a stability of the winding cylinder, and improve a winding efficiency and a quality of a coil of a stereoscopic wound iron core product.

The technical solutions used in the disclosure to solve the problem are as follows.

A winding cylinder of a stereoscopic wound iron core transformer includes an outer cylinder, an inner cylinder and a tension assembly, wherein the outer cylinder is movably connected with the inner cylinder through a bearing assembly, and the outer cylinder rotatable around an axis of the inner cylinder; the tension assembly includes a screw, a spring and a connecting assembly; the connecting assembly includes a fixing portion, a friction portion and a transmission portion, the friction portion and the transmission portion are both arranged around the inner cylinder, and the transmission portion is fixedly connected with the outer cylinder; a side face of the inner cylinder is provided with a through hole, and the fixing portion is configured to penetrate through the through hole to be fixedly connected with the friction portion; and the spring is arranged around the screw, and two ends of the spring are respectively attached to the screw and the fixing portion.

The winding cylinder of the stereoscopic wound iron core transformer above at least has the following beneficial effects. By arranging the outer cylinder and the inner cylinder, a foil tape or interlayer paper wound on the outer cylinder can be stably and rapidly conveyed outwardly along with rotation of the outer cylinder, thus improving a winding efficiency of a stereoscopic wound iron core product. By arranging the tension assembly, when the transmission portion rotates under drive of the outer cylinder, the friction portion generates a friction force with the transmission portion, and then the outer cylinder exerts a tension on the foil tape or interlayer paper, thus avoiding dislocation of the foil tape or the interlayer paper, and ensuring a quality of a coil.

Further, the inner cylinder is provided with a screw hole, and a lower end of the screw is provided with a thread matched with the screw hole; and an upper end of the screw is provided with an adjusting hole. By arranging the thread and the adjusting hole, position of the screw with respect to the inner cylinder can be changed conveniently, to adjust a pressure exerted by the spring on the fixing portion, and the friction force between the friction portion and the transmission portion, thereby adjusting the tension exerted by the outer cylinder on the foil tape or the interlayer paper, and improving a universality and use convenience of the winding cylinder of the stereoscopic wound iron core transformer.

Further, the bearing assembly includes an upper connecting portion and a lower connecting portion; and the upper connecting portion and the lower connecting portion are both arranged between the outer cylinder and the inner cylinder. By arranging the upper connecting portion and the lower connecting portion, a connection stability between the outer cylinder and the inner cylinder can be improved, and displacement of the outer cylinder during high-speed rotation can be avoided, so as to ensure a quality of the coil.

Further, the upper connecting portion includes a first bearing pedestal and a first bearing, and the first bearing is nested in the first bearing pedestal; the first bearing pedestal is fixedly connected with the outer cylinder; and an inner ring of the first bearing is in interference fit with the inner cylinder. By arranging the first bearing pedestal and the first bearing, a connection stability between an upper end of the inner cylinder and the outer cylinder can be ensured, and coaxiality between the outer cylinder and the inner cylinder can be improved.

Further, the lower connecting portion includes a second bearing pedestal and a second bearing, and a bottom portion of the second bearing pedestal is further provided with a third bearing; the second bearing pedestal is fixedly connected with the outer cylinder; and inner rings of the second bearing and the third bearing are both in interference fit with the inner cylinder. By arranging the second bearing pedestal and the second bearing, a connection stability between a lower end of the inner cylinder and the outer cylinder can be ensured.

Further, the transmission portion is provided with a positioning block, and the second bearing pedestal is provided with a groove matched with the positioning block. By arranging the positioning block and the groove, the lower connecting portion and the connecting assembly can be positioned and mounted conveniently, so as to improve a mounting convenience of the winding cylinder of the stereoscopic wound iron core transformer.

Further, a lower end of the inner cylinder is provided with a mounting base, and one end of the third bearing far away from the second bearing pedestal is attached to the mounting base. By arranging the mounting base, the inner cylinder can be rapidly fixed and mounted, so as to improve a mounting convenience of the winding cylinder of the stereoscopic wound iron core transformer.

Further, the mounting base is evenly provided with a plurality of mounting holes. By arranging the mounting holes, a mounting stability of the inner cylinder can be improved, and displacement of the winding cylinder of the stereoscopic wound iron core transformer can be avoided.

Further, the outer cylinder includes an upper shell and a lower shell; and the upper shell and the lower shell are fixedly connected with each other through a connecting ring. By arranging the upper shell, the lower shell and the connecting ring, a height of the connecting ring can be adjusted according to a height of the material to make a height of the outer cylinder consistent with that of the material, so as to improve a universality of the winding cylinder of the stereoscopic wound iron core transformer.

Further, each of the upper shell and the lower shell is provided with a respective baffle extending outwardly at a respective side far away from the connecting ring. By arranging the baffle, the outer cylinder can function to guide the mounting of the material, which avoids deviation of the material during conveying.

The winding cylinder of the stereoscopic wound iron core transformer above has the beneficial effects as follows. By arranging the outer cylinder and the inner cylinder, the foil tape or the interlayer paper wound on the outer cylinder can be stably and rapidly conveyed outwardly along with rotation of the outer cylinder, thus improving a winding efficiency of a stereoscopic wound iron core product. By arranging the tension assembly, when the transmission portion rotates under drive of the outer cylinder, the friction portion generates the friction force with the transmission portion, and then the outer cylinder exerts the tension on the foil tape or the interlayer paper, thus avoiding dislocation of the foil tape or the interlayer paper, and ensuring a quality of a coil. By arranging the thread and the adjusting hole, position of the screw with respect to the inner cylinder can be changed conveniently, to adjust the tension exerted by the outer cylinder on the foil tape or the interlayer paper, thereby improving a universality and use convenience of the winding cylinder of the stereoscopic wound iron core transformer. By arranging the upper shell, the lower shell and the connecting ring, the height of the connecting ring can be adjusted according to the height of the material to make the height of the outer cylinder consistent with that of the material, so as to improve a universality of the winding cylinder of the stereoscopic wound iron core transformer.

The additional aspects and advantages of the disclosure will be given in part in the following description, and will become apparent in part from the following description, or will be learned through the practice of the disclosure.

BRIEF DESCRIPTION OF THE DRAWINGS

The above and additional aspects and advantages of the disclosure will be apparent and easily understood from the descriptions of the embodiments with reference to the following accompanying drawings, wherein.

DETAILED DESCRIPTION

Figure 1:
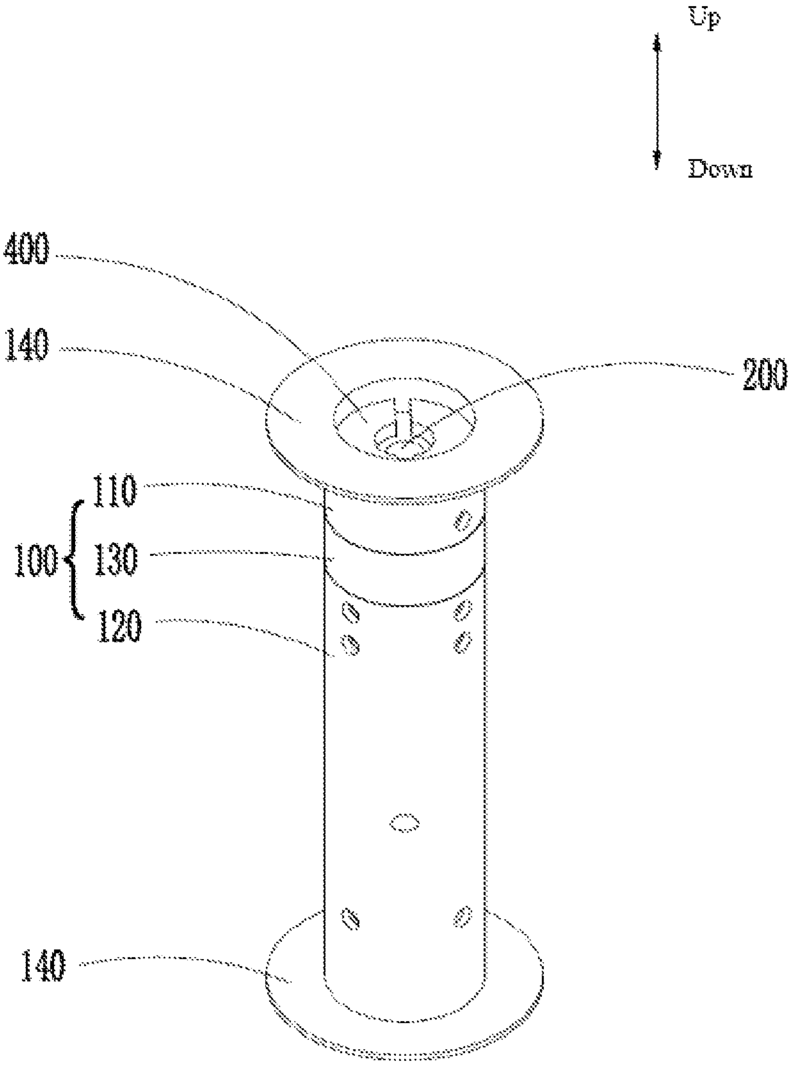
FIG. 1 is a structural diagram of a winding cylinder of a stereoscopic wound iron core transformer according to an embodiment of the disclosure.

The embodiments of the disclosure are described in detail hereinafter, and examples of the embodiments are shown in the accompanying drawings, wherein the same or similar reference numerals throughout the accompanying drawings denote the same or similar elements or elements having the same or similar functions. The embodiments described below with reference to the accompanying drawings are exemplary and are only intended to explain the disclosure, but should not be understood as limiting the disclosure.

With reference to FIG. 1 to FIG. 4, an embodiment of the disclosure provides a winding cylinder of a stereoscopic wound iron core transformer, including an outer cylinder 100, an inner cylinder 200 and a tension assembly 300; the outer cylinder 100 is movably connected with the inner cylinder 200 through a bearing assembly 400, and the outer cylinder 100 rotates around an axis of the inner cylinder 200; the tension assembly 300 includes a screw 310, a spring 320 and a connecting assembly 330; the connecting assembly 330 includes a fixing portion 331, a friction portion 332 and a transmission portion 333, the friction portion 332 and the transmission portion 333 are both arranged around the inner cylinder 200, and the transmission portion 333 is fixedly connected with the outer cylinder 100; a side face of the inner cylinder 200 is provided with a through hole 210, and the fixing portion 331 penetrates through the through hole 210 and is fixedly connected with the friction portion 332; the spring 320 is arranged around the screw 310, and two ends of the spring 320 are respectively attached to the screw 310 and the fixing portion 331.

By arranging the outer cylinder 100 and the inner cylinder 200, a foil tape or interlayer paper wound on the outer cylinder 100 can be stably and rapidly conveyed outwardly along with rotation of the outer cylinder 100, thus improving a winding efficiency of a stereoscopic wound iron core product. By arranging the tension assembly 300, when the transmission portion 333 rotates under drive of the outer cylinder 100, the friction portion 332 generates a friction force with the transmission portion 333, and then the outer cylinder 100 exerts a tension on the foil tape or the interlayer paper, thus avoiding dislocation of the foil tape or the interlayer paper, and ensuring a quality of a coil.

Figure 2:
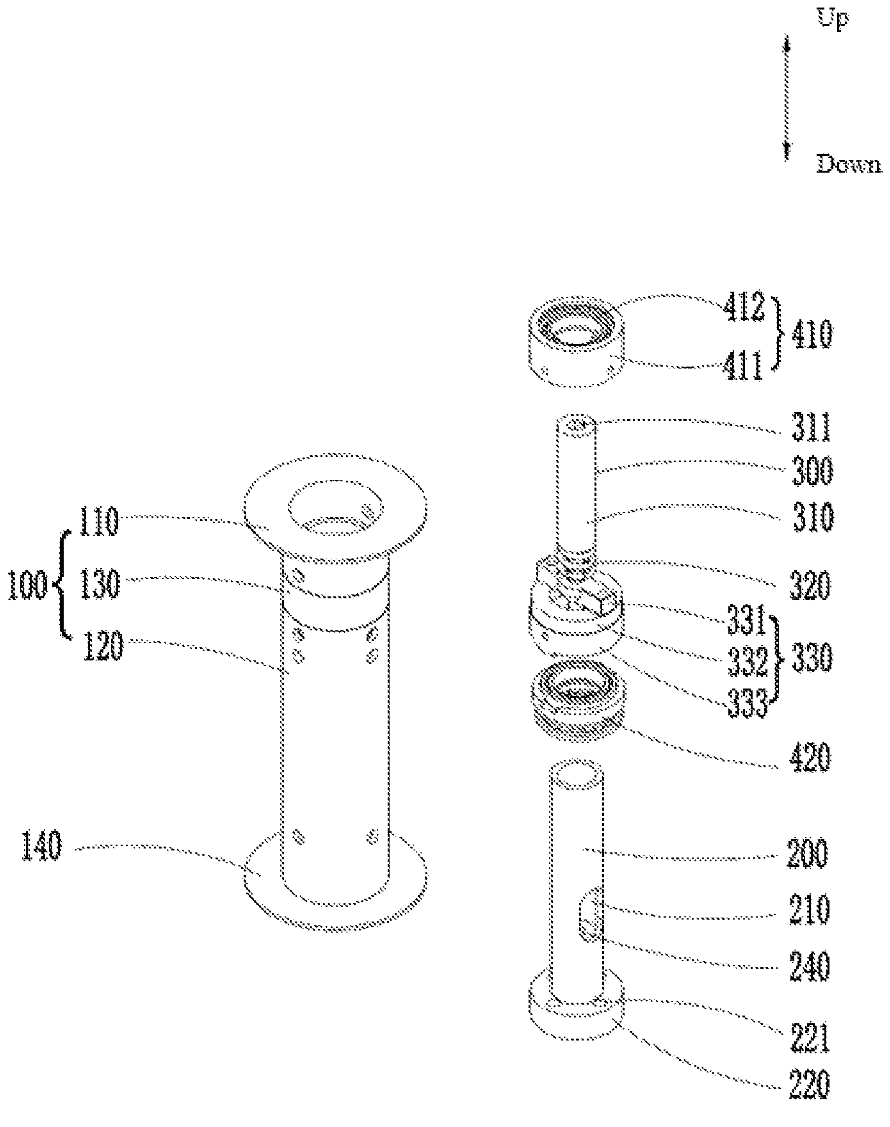
FIG. 2 is an exploded structural diagram of the winding cylinder of the stereoscopic wound iron core transformer according to an embodiment of the disclosure.
Figure 3:
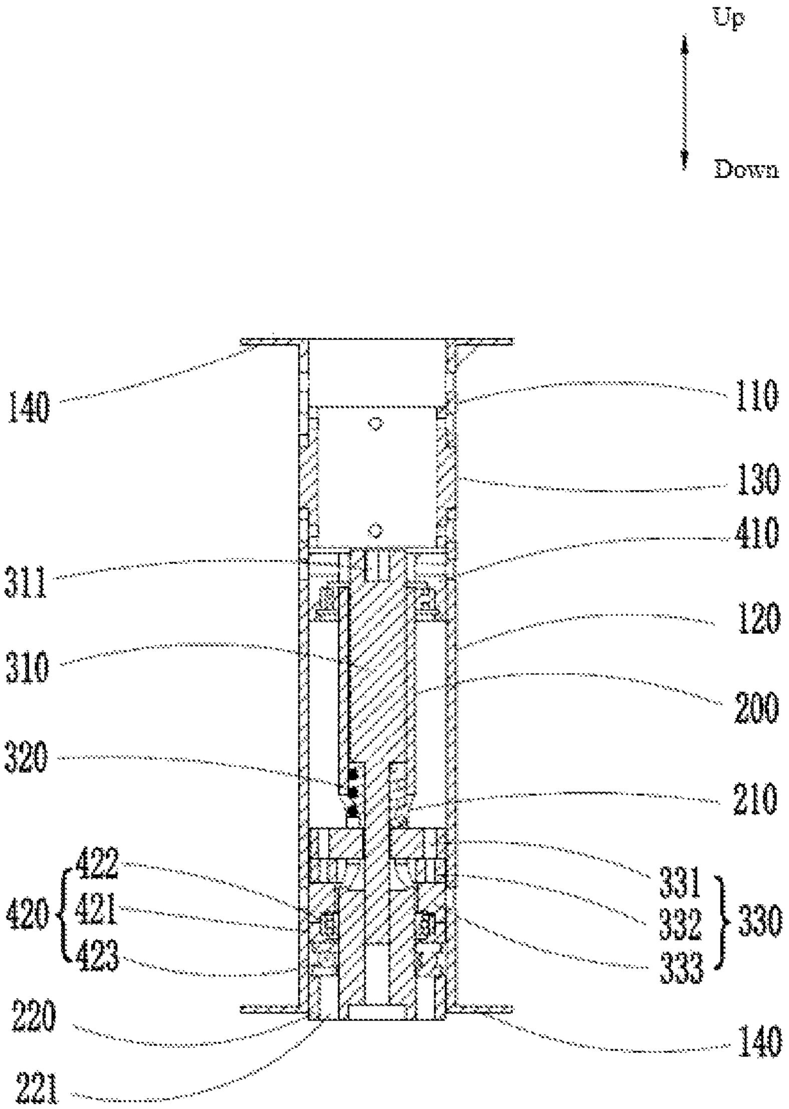
FIG. 3 is a cross-section view of the winding cylinder of the stereoscopic wound iron core transformer according to an embodiment of the disclosure.
Figure 4:
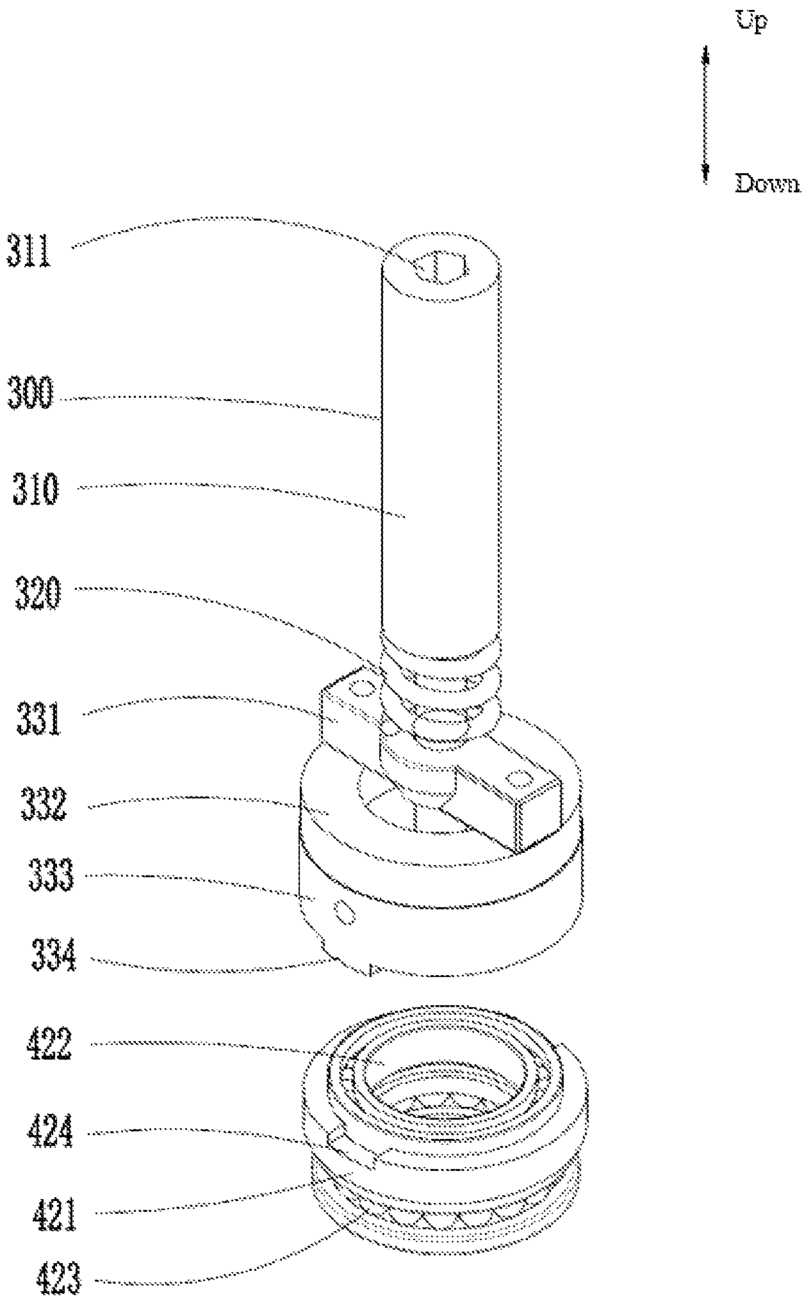
FIG. 4 is a structural diagram of a tension assembly and a lower connecting portion in FIG. 2.

With reference to FIG. 2 and FIG. 4, in another embodiment, the inner cylinder 200 is provided with a screw hole 240, and a lower end of the screw 310 is provided with a thread matched with the screw hole 240; and an upper end of the screw 310 is provided with an adjusting hole 311. By arranging the thread and the adjusting hole 311, position of the screw 310 with respect to the inner cylinder 200 can be changed conveniently, to adjust a pressure exerted by the spring 320 on the fixing portion 331 and the friction force between the friction portion 332 and the transmission portion 333, thereby adjusting the tension exerted by the outer cylinder 100 on the foil tape or the interlayer paper, and improving a universality and use convenience of the winding cylinder of the stereoscopic wound iron core transformer.

In another embodiment, the bearing assembly 400 includes an upper connecting portion 410 and a lower connecting portion 420; and the upper connecting portion 410 and the lower connecting portion 420 are both arranged between the outer cylinder 100 and the inner cylinder 200. By arranging the upper connecting portion 410 and the lower connecting portion 420, a connection stability between the outer cylinder 100 and the inner cylinder 200 can be improved, and displacement of the outer cylinder 100 during high-speed rotation can be avoided, so as to ensure a quality of the coil.

In another embodiment, the upper connecting portion 410 includes a first bearing pedestal 411 and a first bearing 412, and the first bearing 412 is nested in the first bearing pedestal 411; the first bearing pedestal 411 is fixedly connected with the outer cylinder 100; and an inner ring of the first bearing 412 is in interference fit with the inner cylinder 200. By arranging the first bearing pedestal 411 and the first bearing 412, a connection stability between an upper end of the inner cylinder 200 and the outer cylinder 100 can be ensured, and coaxiality between the outer cylinder 100 and the inner cylinder 200 can be improved.

In another embodiment, the lower connecting portion 420 includes a second bearing pedestal 421 and a second bearing 422, and a bottom portion of the second bearing pedestal 421 is further provided with a third bearing 423; the second bearing pedestal 421 is fixedly connected with the outer cylinder 100; and inner rings of the second bearing 422 and the third bearing 423 are both in interference fit with the inner cylinder 200. By arranging the second bearing pedestal 421 and the second bearing 422, a connection stability between a lower end of the inner cylinder 200 and the outer cylinder 100 can be ensured.

With reference to FIG. 4, in another embodiment, the transmission portion 333 is provided with a positioning block 334, and the second bearing pedestal 421 is provided with a groove 424 matched with the positioning block 334. By arranging the positioning block 334 and the groove 424, the lower connecting portion 420 and the connecting assembly 330 can be positioned and mounted conveniently, so as to improve a mounting convenience of the winding cylinder of the stereoscopic wound iron core transformer.

In another embodiment, a lower end of the inner cylinder 200 is provided with a mounting base 220, and one end of the third bearing 423 far away from the second bearing pedestal 421 is attached to the mounting base 220. By arranging the mounting base 220, the inner cylinder 200 can be rapidly fixed and mounted, so as to improve a mounting convenience of the winding cylinder of the stereoscopic wound iron core transformer.

In another embodiment, the mounting base 220 is evenly provided with a plurality of mounting holes 221. By arranging the mounting holes 221, a mounting stability of the inner cylinder 200 can be improved, and displacement of the winding cylinder of the stereoscopic wound iron core transformer can be avoided.

In another embodiment, the outer cylinder 100 includes an upper shell 110 and a lower shell 120; and the upper shell 110 and the lower shell 120 are fixedly connected with each other through a connecting ring 130. By arranging the upper shell 110, the lower shell 120 and the connecting ring 130, a height of the connecting ring 130 can be adjusted according to a height of the material to make a height of the outer cylinder 100 consistent with that of the material, so as to improve a universality of the winding cylinder of the stereoscopic wound iron core transformer.

In another embodiment, each of the upper shell 110 and the lower shell 120 is provided with a respective baffle 140 extending outwardly at a respective side far away from the connecting ring 130. By arranging the baffle 140, the outer cylinder 100 can function to guide the mounting of the material, which avoids deviation of the material during conveying.

The operating principle of the disclosure is further described hereinafter.

Before use, firstly, according to specifications of the material, such as a length, a height and a thickness of the foil tape or the interlayer paper, different sizes of connecting rings 130 are selected to ensure that the height of the outer cylinder 100 is consistent with a winding height of the foil tape or the interlayer paper, so that the cylinder can be loaded with the foil tapes or the interlayer paper with different widths and thicknesses. The tension assembly 300 and the inner cylinder 200 are mounted in the lower shell 120 in sequence, and then the upper shell 110 and the lower shell 120 are connected through the connecting ring 130. Then, the material is evenly and tightly wound on the outer cylinder 100, and the baffles 140 at upper and lower ends of the outer cylinder 100 play a role of limiting, so as to avoid looseness and deviation of the foil tape or the interlayer paper during winding. Finally, the outer cylinder 100 is arranged in the winding die through the mounting base 220 and the mounting holes 221, and a loading operation of the winding is finished. When the winding die starts to be operated, the foil tape or the interlayer paper on the cylinder is driven to be conveyed outwardly, and then the outer cylinder 100 is driven to rotate around the axis of the inner cylinder 200. Meanwhile, the outer cylinder 100 drives the transmission portion 333 and the second bearing pedestal 421 to rotate. Since two ends of the spring 320 are respectively attached to the screw 310 and the fixing portion 331, the fixing portion 331 exerts a pressure on the transmission portion 333 through the friction portion 332, which generates a friction force between the friction portion 332 and the transmission portion 333, so that the outer cylinder 100 generates a tension on the foil tape or the interlayer paper during conveying, and effects of controlling a material conveying speed and ensuring a winding quality are achieved. In addition, since the screw 310 penetrates through the fixing portion 331 and is in threaded connection with the screw hole 240, an operator can change a relative position between the screw 310 and the fixing portion 331 through the adjusting hole 311, and then change the pressure exerted by the spring 320 on the fixing portion 331, thus changing the friction force between the friction portion 332 and the transmission portion 333, and rapidly adjusting the tension of the outer cylinder 100. During production, the tension is adjusted according to a winding effect, which can effectively improve a winding quality and a winding efficiency. During material conveying, since the outer cylinder 100 is connected with the inner cylinder 200 through the upper connecting portion 410 and the lower connecting portion 420, the inner cylinder 200 is sleeved with the first bearing 412, the second bearing 422 and the third bearing 423, which further ensures coaxiality between the outer cylinder 100 and the inner cylinder 200, avoids displacement and falling off of the outer cylinder 100, and improves a material conveying stability of the winding cylinder. The foil tape or interlayer paper on the outer cylinder 100 is always kept between the baffles 140, so that the baffles 140 play a guiding role, thus avoiding the deviation and falling off of the foil tape or interlayer paper during material conveying.

It can be seen from the above description that in the winding cylinder of the stereoscopic wound iron core transformer of the disclosure, by arranging the outer cylinder 100 and the inner cylinder 200, the foil tape or the interlayer paper wound on the outer cylinder 100 can be stably and rapidly conveyed outwardly along with rotation of the outer cylinder 100, thus improving a winding efficiency of a stereoscopic wound iron core product. By arranging the tension assembly 300, when the transmission portion 333 rotates under drive of the outer cylinder 100, the friction portion 332 generates the friction force with the transmission portion 333, and then the outer cylinder 100 exerts the tension on the foil tape or the interlayer paper, thus avoiding dislocation of the foil tape or the interlayer paper, and ensuring a quality of a coil. By arranging the thread and the adjusting hole 311, position of the screw 310 with respect to the inner cylinder 200 can be changed conveniently, to adjust the tension exerted by the outer cylinder 100 on the foil tape or the interlayer paper thereby improving a universality and use convenience of the winding cylinder of the stereoscopic wound iron core transformer. By arranging the upper shell 110, the lower shell 120 and the connecting ring 130, the height of the connecting ring 130 can be adjusted according to the height of the material to make the height of the outer cylinder 100 consistent with that of the material, so as to improve a universality of the winding cylinder of the stereoscopic wound iron core transformer.

The embodiments of the disclosure are described in detail with reference to the accompanying drawings above, but the disclosure is not limited to the above embodiments, and various changes may also be made within the knowledge scope of those of ordinary skills in the art without departing from the purpose of the disclosure.

The invention claimed is:

1. A cylinder for winding a stereoscopic wound iron core transformer, comprising:

- an outer cylinder;
- an inner cylinder, wherein the outer cylinder is coaxially arranged outside the inner cylinder; and
- a tension assembly, wherein the outer cylinder is movably connected with the inner cylinder through a bearing assembly, and the outer cylinder is rotatable around an axis of the inner cylinder; the tension assembly comprising:
  - a screw;
  - a spring; and
  - a connecting assembly, the connecting assembly comprising:
    - a fixing portion;
    - a friction portion; and
    - a transmission portion, the friction portion and the transmission portion are both sleeved on the inner cylinder, the friction portion is attached to the transmission portion and located on an upper side of the transmission portion, and the transmission portion is fixedly connected with an inner wall of the outer cylinder;
- a side face of the inner cylinder is provided with a through hole, and the fixing portion is configured to penetrate through the through hole to be fixedly connected with the friction portion; and
- the spring is arranged around the screw, and two ends of the spring are respectively attached to the screw and the fixing portion;
- wherein the inner cylinder is provided with a screw hole, the screw hole is arranged at a lower side of the through hole, a lower end of the screw is provided with a thread matched with the screw hole, and an upper end of the screw is provided with an adjusting hole.

2. The cylinder for winding the stereoscopic wound iron core transformer of claim 1, wherein the bearing assembly further comprises:

- an upper connecting portion; and
- a lower connecting portion, the upper connecting portion and the lower connecting portion are both arranged between the outer cylinder and the inner cylinder.

3. The cylinder for winding the stereoscopic wound iron core transformer of claim 2, wherein the upper connecting portion further comprises:

- a first bearing pedestal; and
- a first bearing, the first bearing is nested in the first bearing pedestal, the first bearing pedestal is fixedly connected with the outer cylinder and, an inner ring of the first bearing is in interference fit with the inner cylinder.

4. The cylinder for winding the stereoscopic wound iron core transformer of claim 2, wherein the lower connecting portion further comprises:

- a second bearing pedestal;
- a second bearing, a bottom portion of the second bearing pedestal is further provided with a third bearing, the second bearing pedestal is fixedly connected with the outer cylinder; and
- inner rings of the second bearing and the third bearing are both in interference fit with the inner cylinder.

5. The cylinder for winding the stereoscopic wound iron core transformer of claim 4, wherein the transmission portion is provided with a positioning block, and the second bearing pedestal is provided with a groove matched with the positioning block.

6. The cylinder for winding the stereoscopic wound iron core transformer of claim 4, wherein a lower end of the inner cylinder is provided with a mounting base, and one end of the third bearing far away from the second bearing pedestal is attached to the mounting base.

7. The cylinder for winding the stereoscopic wound iron core transformer of claim 6, wherein the mounting base is evenly provided with a plurality of mounting holes.

8. The cylinder for winding the stereoscopic wound iron core transformer of claim 1, wherein the outer cylinder comprises an upper shell and a lower shell, and the upper shell and the lower shell are fixedly connected with each other through a connecting ring.

9. The cylinder for winding the stereoscopic wound iron core transformer of claim 8, wherein each of the upper shell and the lower shell is provided with a respective baffle extending outwardly at a respective side far away from the connecting ring.

* * * * *